US009003423B1

(12) United States Patent
Rodriguez Valadez et al.

(10) Patent No.: US 9,003,423 B1
(45) Date of Patent: Apr. 7, 2015

(54) DYNAMIC BROWSER COMPATIBILITY CHECKER

(75) Inventors: Pedro de Jesus Rodriguez Valadez, Seattle, WA (US); John S. Yuhan, Lynnwood, WA (US)

(73) Assignee: Amazon Technologies, Inc., Reno, NV (US)

(*) Notice: Subject to any disclaimer, the term of this patent is extended or adjusted under 35 U.S.C. 154(b) by 36 days.

(21) Appl. No.: 13/194,610

(22) Filed: Jul. 29, 2011

(51) Int. Cl.
*G06F 3/00* (2006.01)
*G06F 9/54* (2006.01)

(52) U.S. Cl.
CPC . *G06F 9/54* (2013.01); *G06F 9/542* (2013.01)

(58) Field of Classification Search
CPC .................................. G06F 9/542; G06F 9/54
USPC .......................................... 719/310; 715/760
See application file for complete search history.

(56) References Cited

U.S. PATENT DOCUMENTS

| 6,223,190 B1* | 4/2001 | Aihara et al. ................. 715/234 |
| 6,877,137 B1* | 4/2005 | Rivette et al. ................ 715/230 |
| 7,171,483 B2* | 1/2007 | Klein ............................ 709/232 |
| 7,725,574 B2* | 5/2010 | O'Connell et al. ........... 709/224 |
| RE41,440 E * | 7/2010 | Briscoe et al. ............... 709/217 |
| 8,103,692 B2* | 1/2012 | Kim et al. ..................... 707/772 |
| 2002/0120506 A1 | 8/2002 | Hagen |
| 2003/0061283 A1 | 3/2003 | Dutta et al. |
| 2005/0108299 A1* | 5/2005 | Nakajima ..................... 707/201 |
| 2005/0223363 A1 | 10/2005 | Black-Ziegelbein et al. |
| 2006/0212803 A1 | 9/2006 | Arokiaswamy |
| 2007/0234195 A1* | 10/2007 | Wells .......................... 715/501.1 |
| 2008/0178043 A1* | 7/2008 | Xu ................................... 714/32 |
| 2008/0263193 A1* | 10/2008 | Chalemin et al. ............. 709/224 |
| 2009/0183171 A1* | 7/2009 | Isaacs et al. .................. 719/311 |
| 2009/0240654 A1* | 9/2009 | Limber et al. ..................... 707/1 |
| 2009/0287791 A1 | 11/2009 | Mackey |
| 2010/0175050 A1* | 7/2010 | Wang et al. ................... 717/124 |
| 2010/0211893 A1 | 8/2010 | Fanning et al. |
| 2011/0077892 A1* | 3/2011 | Emami et al. ................. 702/113 |
| 2011/0093560 A1* | 4/2011 | Morris .......................... 709/217 |
| 2011/0093773 A1 | 4/2011 | Yee |
| 2011/0214163 A1* | 9/2011 | Smith et al. ...................... 726/4 |
| 2011/0296177 A1* | 12/2011 | Jamjoom et al. ............. 713/168 |
| 2012/0173989 A1* | 7/2012 | Chen et al. ................... 715/739 |
| 2012/0331406 A1* | 12/2012 | Baird et al. ................... 715/760 |

OTHER PUBLICATIONS

Laila Paganelli, Intelligent Analysis of user interactions with web Applications, Jan. 16, 2002.*
Browsershots Website, retrieved on Feb. 9, 2010 at <<http://browsershots.org/>> Browsershots.org, 1 pg.

(Continued)

*Primary Examiner* — Lechi Truong
(74) *Attorney, Agent, or Firm* — Lee & Hayes, PLLC

(57) ABSTRACT

Browser compatibility checking of a web page source document that generates one or more web page is implemented on one or more servers. The browser compatibility checking of a web page may involve receiving a script file that includes script commands for capturing the appearance of the web page following various dynamic interactions with one or more browsers. An interaction simulation engine may be directed to simulate an interaction with each web page based on an interaction script command included in the script file. Further, an image capture engine may be trigger by an image capture script command included in the script file to capture an image of the web page.

27 Claims, 9 Drawing Sheets

(56) References Cited

OTHER PUBLICATIONS

"Gomez Multi-Browser Performance Test," retrieved from <<http://www.gomez.com/multi-browser-performance-test/>>, available as early as Jul. 29, 2011, 1 pg.

"Gomez On-Demand-Automated-Cross-Browser-Testing," retrieved from <<http://www.gomez.com/wp-content/downloads/On-Demand-Automated-Cross-Browser-Testing.pdf>>, available at least as early as Mar. 14, 2011, pp. 1-6.

ImageMagick Website, retrieved on Feb. 9, 2010 at <<http://www.imagemagick.org/script/index.php>> ImageMagick Studio LLC, 3 pgs.

PerfectoMobile.com, retrieved from <<http://www.perfectomobile.com/portal/cms/index.html>> and available at least as early as Jul. 29, 2011, 1 pg.

Lindley, "JQuery Cookbook", O'Reilly Media, Inc., First Edition, Nov. 2009, 13 pages.

Nathan, "Using Litmus to integrate cross-browser testing into our workflow", retrieved at <<http:www.boost.co.nz/blog/design/cross-browser-testing/>>, Boost Blog, Aug. 2009, 8 pages.

Office action for U.S. Appl. No. 12/732,473, mailed on Nov. 28, 2012, Rodriguez Valadez et al., "Browser Compatibility Checker Tool", 61 pages.

Office action for U.S. Appl. No. 12/732,473, mailed on May 8, 2013, Rodriguez Valadez et al., "Browser Compatibility Checker Tool", 78 pages.

\* cited by examiner

US 9,003,423 B1

DYNAMIC BROWSER COMPATIBILITY CHECKER

BACKGROUND

Web users may use different applications, such as web browsers, to view web content. Web browsers may be developed for different operating systems and hardware platforms, or may be released by different browser developers for the same operating system platform. Moreover, a particular web browser may exist in several different versions as features are added or updated by browser developers.

As a result, web content providers spend considerable amounts of time and effort to ensure that their web pages are rendered and displayed properly across a broad set of commonly used web browsers, regardless of the version numbers and/or developers of the web browsers. Failure to properly test the rendering of web pages by a particular web browser may cause web content to be displayed incorrectly, web-based functions to fail to execute, or may result in a loss of valuable data. In instances where a web content provider depends on the web content to conduct commerce activities, the failure of a particular version of web browser to properly render a web page may result in loss of productivity, damage to business reputation or relations, or loss of potential sales or profits.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
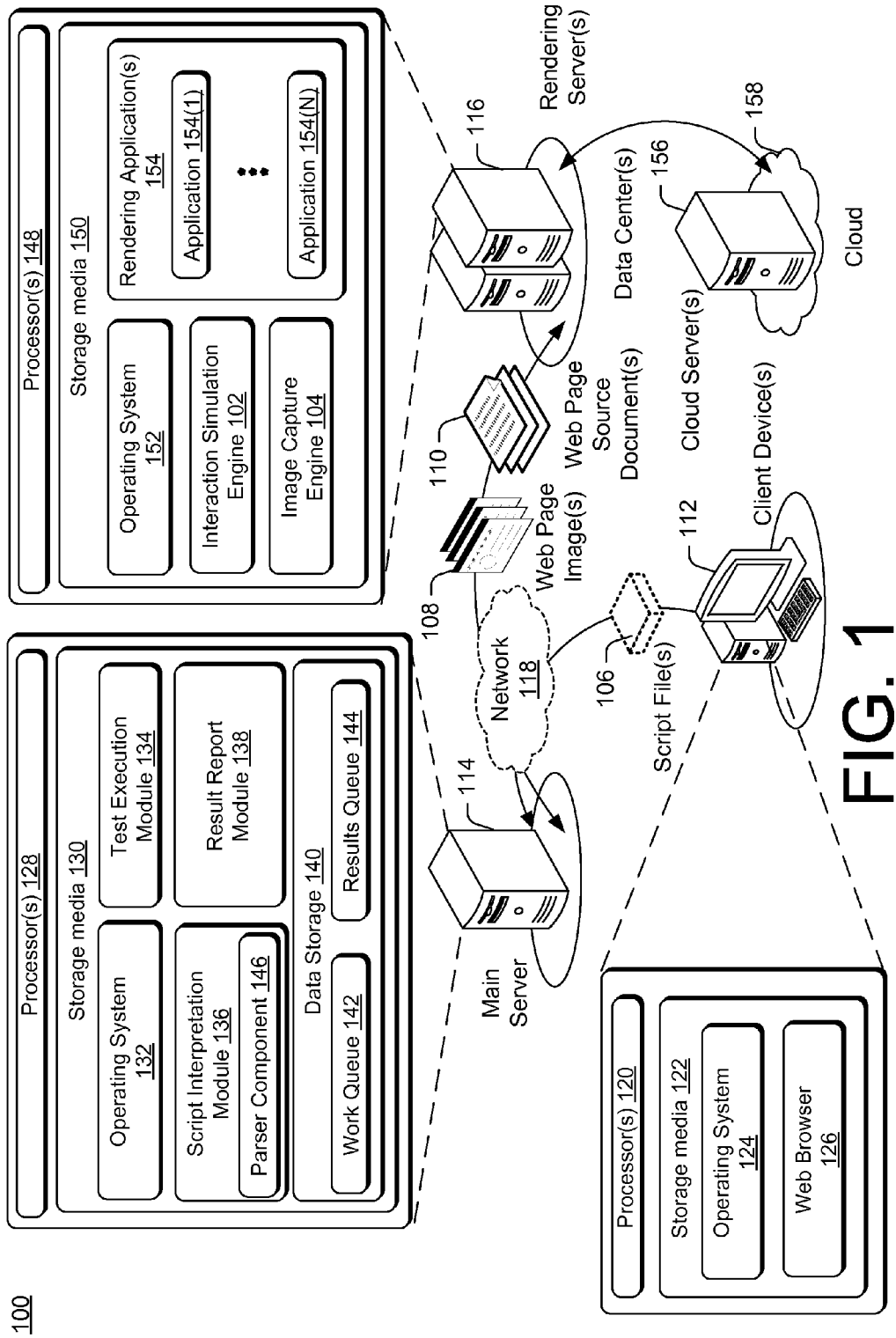
FIG. 1 shows an illustrative computing environment for implementing one or more embodiments of a dynamic browser compatibility checker.

The disclosure is directed, in part, to an implementation of a dynamic browser compatibility checker that enables a web content developer to check whether production web pages are rendered consistently by different web browsers. However, other users, such as quality assurance (QA) engineers, software development managers, product managers, graphic designers, as well as members of the public, may also use the dynamic browser compatibility checker. As described and used herein, a browser or web browser includes any application configured to transform a source document that includes markup language-coded content, such as HyperText Markup Language (HTML)-coded content, into an interactive document page.

In various embodiments, the dynamic browser compatibility checker may enable a user to test the rendering of a web page by different web browsers as the user interacts with one or more dynamic elements on the web page. Such dynamic elements may include interactive content that are capable of changing their visual states and/or functionality in response to user input. For example, dynamic elements may include a fill-in form that is used to submit information to a website, an clickable advertising banner that opens up a new browser window and/or leads the user to a different web page, an interactive game that is playable on the webpage, or multimedia content (e.g., movies) that may be played via an media player window embedded in a web page.

During testing, the dynamic browser compatibility checker may record images of the web page as rendered by each of the web browsers being tested. The recording of the images may occur after each user interaction with a dynamic element on the web page and/or a change in the visual state of the dynamic element. To facilitate testing, the dynamic browser compatibility checker may use a web page interaction simulation engine that automatically performs one or more prescribed user interactions with the dynamic content on a web page or interface controls of a browser that displays the web page. Additionally, the dynamic browser compatibility checker may also use a web page image capture engine that takes snap shots of the visual appearances of web pages. For example, when the dynamic content on a particular web page is a clickable advertising banner, the dynamic browser compatibility checker may record a first image of the web page after a simulated user navigation to the web page, a second image of the web page after a simulated user movement of the cursor over the clickable advertising banner, and a third image of the web page after a simulated user click on the clickable advertising banner.

In this way, the dynamic browser compatibility checker in accordance with the embodiments may enable a user to ensure that each dynamic element on a web page is rendered correctly by different web browsers during user interactions and/or dynamic content display. The different web browsers may include web browsers developed by different developers, different versions of a web browser developed for different operating system or hardware platforms, and/or different versions of the same browser. Accordingly, the dynamic browser compatibility checker may assist web content developers in meeting testing and quality objectives in a more efficient manner, may shorten web page development cycles, and may also reduce the time burden associated with browser compatibility testing of web pages.

In some embodiments, the browser compatibility checking of a web page may involve receiving a script file that includes script commands for capturing the appearance of the web page following various dynamic interactions. An interaction simulation engine may be directed to simulate an interaction with each web page based on an interaction script command included in the script file. Further, an image capture engine may be trigger by an image capture script command included in the script file to capture an image of the web page.

Illustrative System Architecture

FIG. 1 shows an illustrative computing environment 100 in which one or more embodiments of a dynamic browser compatibility checker may be implemented. In order to check the compatibility of a web page that includes dynamic web content with multiple web browsers, the dynamic browser checker may use an interaction simulation engine 102 and an image capture engine 104. The interaction simulation engine 102 may simulate user interactions with the web page. The image capture image 104 may capture the appearances of the web page as rendered by different browsers after each interaction. The nature of the interaction simulated and the timing between each simulated interaction and each web page image capture may be dictated by a script file 106. In various embodiments, a script file may include one or more script commands that cause the interaction simulation engine 102 to perform one or more corresponding prescribed interactions with a web page. Further, interspersed with these script commands may be one or more script commands that trigger the image capture engine 104 to capture images 108 of the web page after each interaction.

For example, a script file may include a first script command to direct the image capture engine 104 to capture an image of a dynamic web page that includes an advertising banner prior to the advertising banner being activated (e.g., selected). A second script command included in the script file may direct the interaction simulation engine 102 to simulate a user focus on the advertising banner (e.g., placing a cursor over the advertising banner). The user focus to the advertising banner may cause a change in the appearance of the dynamic web page. For instance, the advertising banner may display additional graphics or text in response to the user focus. Accordingly, a third script command included in the script file may direct the image capture engine 104 to capture an image of the web page with the additional graphics and/or text as rendered by the browser. A forth script command included in the script file may direct the interaction simulation engine 102 to simulate an activation (e.g., selection) of the advertising banner, which may cause a change in the appearance of the web page as new text or graphics are dynamically loaded into the web page. A fifth script command in the script file may direct the image capture engine 104 to capture an image of the web page, as rendered by the web browser, after the dynamic loading of the new text or graphics.

In other embodiments, depending on the configuration of the interaction simulation engine 102 and the image capture engine 104, the simulated interactions and the web page image captures directed by the script commands in a script file may be performed with respect to multiple browsers. In this way, the dynamic browser compatibility checker may enable the simultaneous web browser compatibility testing of a web page in relation to multiple browsers. Further, the dynamic browser compatibility checker may enable the web page images generated by the different web browsers after each stage of the test (e.g., after every user interaction) to be presented to a user, so that the user may determine whether each web browser properly rendered the web page at each stage.

Accordingly, the implementation of the dynamic browser compatibility checker, including the functionalities of the interaction simulation engine 102 and the image capture engine 104, are further described below with respect to the various computing devices in the environment 100. For the sake of brevity, the embodiments herein may at times make references to testing the compatibility of a web page with one or more web browsers. However, it will be appreciated that such references are understood to mean that compatibility testing is performed with respect to the underlying source codes, scripts, or other content contained in a web page source document 110 that is rendered into the web page, as well as any internal or external dynamic content that is referred to and/or integrated into the web page.

The environment 100 may include one or more client devices 112, a main server 114, and multiple rendering servers 116 that are communicatively connected by a network 118. The one or more client devices 112 may include any electronic device that is capable of supporting the functionalities of a web browser. In various embodiments, each of the client devices 112 may be a laptop computer, a desktop computer, a tablet computer, a slate computer, a mobile phone, a personal digital assistant (PDA), and/or other electronic devices that are equipped with network communication components, data processing components, and electronic displays for displaying data.

The main server 114 may be located at a data center that is part of a content distribution network (CDN). Likewise, the rendering servers 116 may be located in a single data center, or across multiple data centers. In some embodiments, the rendering servers 116 may be located in the same data center as the main server 114. The network 118 may be a local area network ("LAN"), a larger network such as a wide area network ("WAN"), or a collection of networks, such as the Internet. Protocols for network communication, such as TCP/IP, may be used to implement the network 118. Although embodiments are described herein as using a network such as the Internet, other distribution techniques may be implemented.

Client Device

The client device 112 may include one or more processors 120, a storage media 122, and user controls that enable a user to interact with the device. User controls may include, but are not limited to, combinations of one or more of keypads, keyboards, mouse devices, touch screens, microphones, speech recognition packages, and any other suitable devices or other electronic/software selection controls. A plurality of modules may be stored in the storage media 122. The modules may include routines, programs, objects, components, and data structures that cause the client device 112 to perform particular tasks. In various embodiments, the modules may include an operating system 124 and a web browser 126.

The operating system 124 may include components that enable a client device 112 to receive data via various inputs (e.g., user controls, network interfaces, and/or memory devices), and process the data using the one or more processors 120 to generate output. The operating system 124 may include a display component that presents the output (e.g., display an image on an electronic display, store data in memory, transmit data to another electronic device, etc.). Additionally, the operating system 124 may include other components that perform various other functions generally associated with an operating system.

In various embodiments, a user may interact with the dynamic browser compatibility checker via the web browser 126 of the client device 112. For example, the user may use the web browser 126 to view one or more user interface pages that present the functionalities of the dynamic browser compatibility checker. Through these user interface pages, the user may select web browsers to be tested by the dynamic browser compatibility checker, select static and/or dynamic web pages to be tested, select script files that facilitate the testing of the dynamic web pages, view and analyze resultant web page images, as well implement other functionalities of the dynamic browser compatibility checker. As used herein, a dynamic web page is a web page that includes dynamic elements that change the visual state of the web page in response to user interaction with the web page, without any corresponding discernable change in the displayed uniform resource locator (URL) of the web page.

In some of these embodiments, each of the user interface pages may include HTML objects, script objects, Cascade Style Sheet (CSS) objects, image objects, and/or other static and/or dynamic objects (e.g., algorithms) that facilitate browser compatibility checking web page source documents. These objects may be downloaded from the main server 114 and assembled by the web browser 126.

Main Server

The main server 114 may include one or more processors 128 and a storage media 130, which may store a plurality of modules. The modules may include routines, programs, objects, components, and data structures that cause the main server 114 to perform particular tasks. In various embodiments, the modules may include an operating system 132, a test execution module 134, a script interpretation module 136, and a result report module 138. The storage media may also include data storage 140 that includes a work queue 142 and a results queue 144.

The operating system 132 may include components that enable the main server 114 to receive data via various inputs (e.g., user controls, network interfaces, and/or memory devices), and process the data using the one or more processors 128 to generate output. The operating system 132 may include a display component that presents the output (e.g., display an image on an electronic display, store data in memory, transmit data to another electronic device, etc.). Additionally, the operating system 132 may include other components that perform various other functions generally associated with an operating system.

The test execution module 134 on the main server 114 may receive a URL of the web page source document 110, or a plurality of URLs of corresponding web page source documents, from the client device 112 via a user interface page. The test execution module 134 may provide the user interface page for display on the web browser 126 on the client device 102 when the user of the web browser 126 navigates to the user interface page. The test execution module 134 may also receive and distribute the test options and execution properties that the user selects via a user interface page to other modules on the main server 114.

Figure 2:
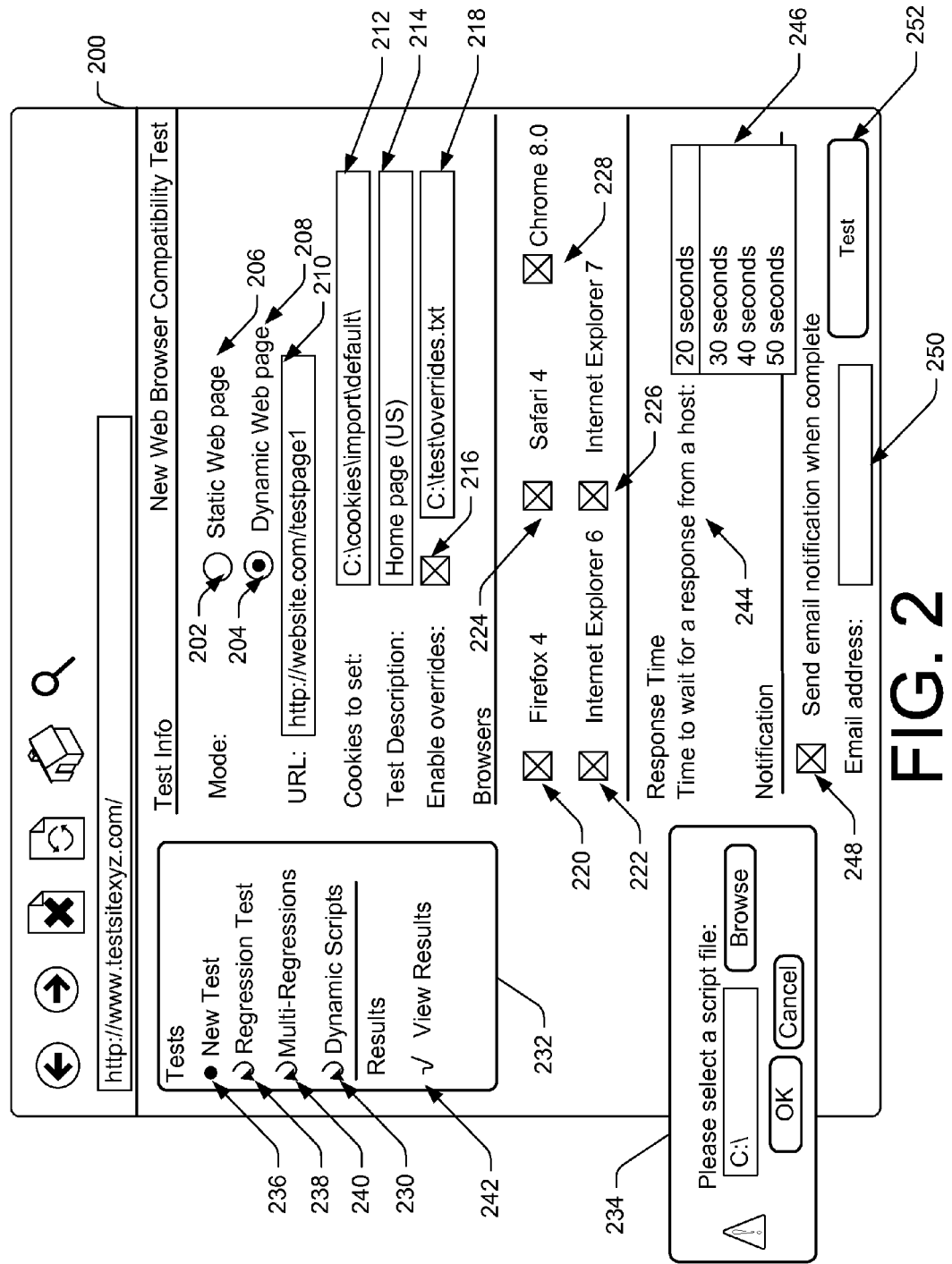
FIG. 2 shows an illustrative interface page of a dynamic browser compatibility checker that enables a user to input test properties.

FIG. 2 shows an illustrative user interface page 200 of a dynamic browser compatibility checker. The user interface page 200 is a data input page that may enable a user to provide the URLs of the web page source documents to be checked by the dynamic browser compatibility checker, as well as test options for conducting the tests. The user interface page 200 may be generated by the test execution module 134.

As shown in FIG. 2, the user interface page 200 may include radio buttons 202 and 204 that respectively correspond to a static test option 206 and a dynamic test option 208. The static test option 206 may enable the user to test a web page without dynamically interacting with the web page. On other hand, the dynamic test option 208 may enable the user to dynamically test a web page by interacting with the web page. Thus, the web page may be a static web page without any dynamic elements or a dynamic web that includes one or more dynamic elements.

The user interface page 200 may further include an address field 210 that enables the user to enter a URL of the web page source document 110 to be tested for browser compatibility. The web page source document 110 may be a source document to a static web page or a dynamic web page. The web page source document 110 may be stored in the main server 114 or any other server within or outside of the computing environment 100. For example, as shown in FIG. 2, the user may enter the URL "http://www.website.com/testpage1" into the address field 210, where the URL corresponds to a web page source document 110 that is stored on the main server 114.

The user interface page 200 may further include a cookie field 212 that enables the user to designate at least one cookie to be used during the processing of the one or more web page source documents 110. In various embodiments, the designated cookie may cause the rendering applications of the dynamic browser compatibility checker to render the one or more web page source documents 110 in a specific way. For example, the cookie may activate or deactivate a certain feature or a particular web page portion coded in the one or more web page source document 110. Thus, with the use of the cookie field 212, the user may test the rendering of the web page source document 110 under different scenarios, in response to certain inputs, and/or specific modifications to the web page source documents 110.

The user interface page 200 may include a test description field 214 that enables the user to provide a description of the web browser compatibility test that is performed. For example, the user may provide the description "Book layout" in the test description field 214.

The user may use the override checkbox 216 of the user interface page 200 to activate (e.g., check) or deactivate (e.g., uncheck) overrides to default settings that the rendering component of the dynamic browser compatibility checker may use to render the web page source document 110. The default settings may be stored on the rendering servers 116. In various embodiments, the overrides may be CSS style overrides or JavaScript overrides. In such embodiments, the override checkbox 216 may be accompanied by an override entry field 218 that enables to user to enter directory path to the document (e.g., text document) where the override setting are located.

The user interface page 200 may also include checkboxes 220-228 that enables the user to select one or more web browsers. For instance, the user may select a web browser by checking the corresponding checkbox, and may deselect the web browser by unchecking the corresponding checkbox. Accordingly, browser compatibility testing for the one or more entered web page source documents 110 may be performed for the selected web browsers. For example, but not as a limitation, the web browsers for selection shown in FIG. 2 may include the Firefox® 4 web browser, the Internet Explorer® 6 web browser, the Internet Explorer® 7 web browser, the Safari® 4 web browser, and the Chrome® 8 web browser. However, it will be appreciated that the user interface page 200 may provide checkboxes for other web browsers in other embodiments. For example, the web browsers available for selection may also include different platform versions of the same web browser. For example, checkboxes may be available for the selection of both Firefox® 4 for the Windows® operating system and Firefox® 4 for the Apple® operating system OS X®. In this way, a user may tailor the web browser compatibility testing of a web page according to different marketing, geographical region, and/or demographic demands.

Further, when the user has selected a web page for dynamic web browser compatibility testing, the user may use a dynamic script option 230 from a menu 232 to select a dynamic script to be used for implementing the test. For example, the activation (e.g., click) of the dynamic script option 230 may result in the pop up of a directory path window 234 that enables the user to navigate to a directory on the client device 112 or the main server 114 and select the desired script file. However, in other embodiments, the activation of the dynamic script option 230 may open up an editor window in which the user may directly compose script commands that are to be executed.

The menu 232 may also include other user options. A new test option 236 may enable the user to start a new web browser compatibility test. A regression test option 238 may enable a user to initiate a web browser compatibility test for a different web page using previous test options as configured via the user interface page 200. Likewise, a multiple regression test option 240 may enable a user to initiate web browser compatibility testing for multiple web pages using a set of previously configured test options. A view results option 242 may enable the user to view the results of previously conducted web browser compatibility tests.

The user interface page 200 may additionally includes an option 244 that enables the user to set a response timeout threshold. The response timeout threshold may determine how long the test execution module 134 is to wait for the web page images of a compatibility test to be rendered before terminating the compatibility test. Accordingly, the response timeout threshold feature may be useful in scenarios in which complex compatibility tests may take longer to run. An option 244 may be set with a pull down menu 246 that contains a list time intervals. Accordingly, by adjusting the response time out threshold using the time intervals available from the pull down menu 246, the user may prevent the test execution module 134 from timing out and prematurely aborting a compatibility test due to slower than expected test execution time.

In some embodiments, the user interface page 200 may further include an email notification checkbox 248 that the user may activate (e.g., check) or deactivate (e.g., uncheck). The activation of the checkbox 248 may cause test execution module 134 to send a notification (e.g., via email, a text message, etc.) to the user after compatibility test has been completed. As such, the email notification checkbox 248 may be accompanied by an email address field 250 in which the user may enter an email address.

As further shown in FIG. 2, once the user has entered the test information for the static web page testing or dynamic web page testing, the user may activate (e.g., click) the test button 252 to upload the information to the main server 114 via the web browser 126. In turn, the test execution module 134 may receive the information and distribute the test options and execution properties to the other modules on the main server 114.

It will be appreciated that while the user interface page 200 is described above as being provided with interface elements such as radio buttons, pull down menus, and checkboxes, such interface elements may be substituted with other interface elements in alternative embodiments.

Returning to FIG. 1, the script interpretation module 136 may interpret script files that are selected to execute the web browser compatibility testing of a web page, such as a dynamic web page. In turn, the test execution module 134 may use the script interpretation module 136 to pass script commands that are included in the script files to either the interaction simulation engine 102 or the image capture engine 104 for execution. As described above, the script file, such as one of the script files 106, may be stored on the client device 112 or the main server 114.

In various embodiments, a script file may include a series of sequential script commands that alternatively direct the interaction simulation engine 102 and the image capture engine 104 to perform actions. For example, a script file may include the following script commands:

| | |
|---|---|
| open; http://www.websitexyz.com/testpage1 | (1) |
| trigger screenshot | (2) |
| clickAndWait; link = Start Here | (3) |
| type; ap_user, johndoe@websitexyz.com | (4) |
| type; ap_password, asdfgh | (5) |
| clickAndWait; signInSubmit | (6) |
| trigger screenshot | (7) |

In this example, script command line (1) may command the interaction simulation engine 102 to direct one or more rendering applications (e.g., browser engines) to navigate to a web page with the URL "http://www.websitexyz.com/testpage1." Once navigation to the corresponding web page has been achieved, script command line (2) may command the image capture engine 104 to capture a corresponding image of the web page as rendered by each of the one or more rendering applications. For example, in one instance, a user may have selected a web page to be tested with the Firefox® 4 web browser and the Internet Explorer® 8 web browser engine. In such an instance, the image capture engine 104 may capture a first web page image of the web page as rendered by the Firefox® 4 web browser engine, and also a second web page image of the web page as rendered by the Internet Explorer® 8 web browser engine.

The script command line (3) may command the interaction simulation engine 102 to click on a link that is named "Start Here" on the web page as rendered by each of the one or more browser engines. Further, once the web page provides a login prompt at each of the one or more web browsers, the script command lines (4), (5), and (6) may respectively command the interaction simulation engine 102 to enter a user name, then a password into the appropriate fields, and subsequently select a login button on the web page. Once the login process has been performed at each of the web pages and new content appears on each web page, the script command line (7) may command the image capture engine 104 to capture a corresponding image of the web page as rendered by each of the one or more browser engines.

In some embodiments, the script interpretation module 136 may distinguish between script commands that are destined for the interaction simulation engine 102 and the script commands that are destined for the image capture engine 104 based on the syntax and/or format of each script command line. In other embodiments, the script interpretation module 136 may distinguish script commands based on whether each script command match script command in a library of script commands pre-designated for the interaction simulation engine 102 or a library of script commands pre-designated for the image capture engine 104. As such, once the intended recipient of a script command has been identified, the script interpretation module 136 may transfer the script command to the appropriate engine for execution.

In some embodiments, the script interpretation module 136 may use a parser component 146 to parse advanced script commands that may be included in a script file. An advance script command may be a script command that performs a complex action on a web page that may consist of several individual action steps. Thus, in such instances, an advanced script command may be a shorthand way of writing several regular script commands that are to be executed. Accordingly, the parser component 146 may translate an advance script command into several regular script commands for execution by the interaction simulation engine 102 in such instances.

However, in other instances, an advance script command may be a command that is implemented with the assistance other components, such as one or more specialized script engines and/or one or more custom web browser execution functionalities. For example, the simulated clicking of a particular advertising banner on a web page and the subsequent maximization of the resultant advertising content may be achieved only with the use JavaScript calls and custom browser execution commands. Thus, in such instances, the parser component 146 may parse out an advanced script command into multiple function calls and one or more regular script commands. Subsequently, the parser component 146 may then route the functions calls to the one or more specialized script engines and/or custom web browser execution functionalities, in additional to sending the regular script commands to the interaction simulation engine 102.

Thus, with the usage of various script commands and/or advanced script commands, a user may develop script files that simulate different interactions with web pages. Such interactions may include scrolling down a web page, typing a query into a search box, paginating or sorting data that has been entered into a fillable form, playing media content (e.g., an audio file or an multimedia video file) that is embedded in a web page, playing an interactive game that is embedded in a web page, and/or make other visual state changes to a web page. For example, the multimedia video file may be an Adobe® Flash® enabled multimedia video. In some embodiments, the advanced script commands may be implemented using asynchronous JavaScript and XML (Ajax) calls that perform Ajax operations using the interaction simulation engine 102.

Figure 3:
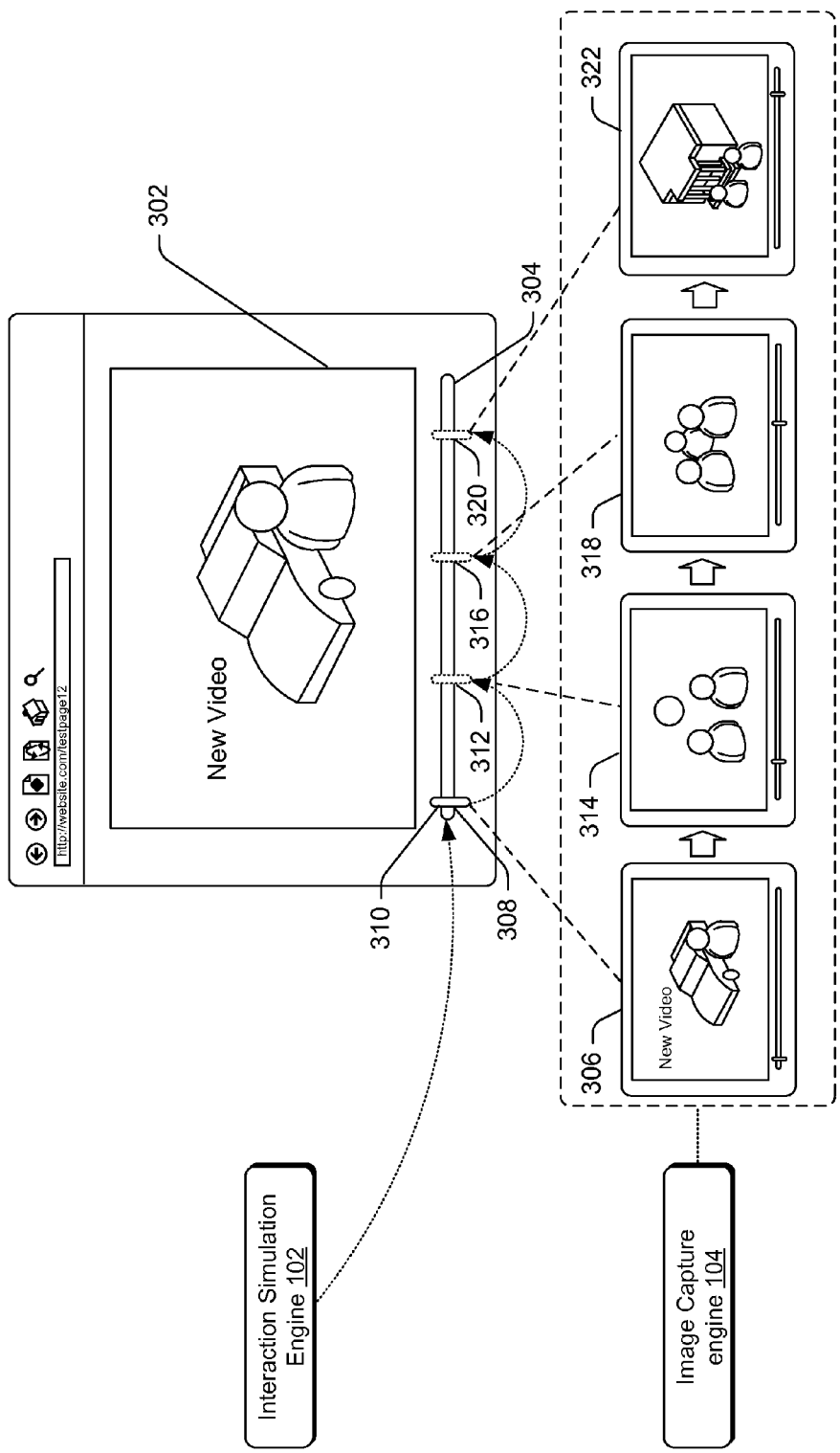
FIG. 3 shows the illustrative coordination between the simulated interactions with a multimedia object and the capture of web page images using script commands in a script file.

FIG. 3 shows the illustrative coordination between the simulated interactions with a multimedia object that is embedded in a web page and the capture of web page images using script commands in a script file. The multimedia object may be a multimedia video 302 that is being played back by a multimedia player. The playback of the multimedia video object by the multimedia player may be controlled by a playback timeline control 304. Accordingly, in one example, the script file may include an initial script command that causes the capture of a web page image 306 that includes a video image from a beginning of the multimedia video, at the time position 308. The capture of the multiple web page images may be facilitated by the image capture engine 104. Subsequently, a second script command in the script file may command the interaction simulation engine 102 to advance a scrubber 310 in the playback time line control 304 by a predetermined time interval to a new time position 312. The second script command may be an advanced script command. A third script command may then cause the capture of a web page image 314 that includes a video image displayed at the new time position 312. In this way, a fourth script command may cause the scrubber 310 to be advanced again by the predetermined time interval to a new time position 316, at which point a fourth script command may then cause the capture of a web page image 318 that includes a video image displayed at the new time position 316. Likewise, a fifth script command may advance the scrubber 310 to another new time position 320, and a sixth script command may then cause the capture of a web page image 322 that includes a video image displayed at the new time position 320, and so on and so forth.

It will be appreciated that other script files may facilitate coordination between the simulated interactions and web page image capture for when the multimedia object is an interactive video game, an audio object, and/or the like.

Returning to FIG. 1, the result report module 138 may present the web page images that are generated by the image capture engine 104 to a user. The result report module 138 may route the web page images to the web browser 126 on the client device 112 for viewing. In various embodiments, the web page images for a web page may be presented as groups of web page images. Each group of web page images are images generated by one or more web browsers tested before or following a particular simulated user interaction with the web page. Further, the result report module 138 may further provide user interface functionalities that enable a user to indicate their judgment as whether each of the one or more web browsers is able to correctly render the web page. The functionalities of the result report module 138 are further illustrated below with respect to FIG. 5.

The data storage 140 may include a work queue 142 that stores web browser compatibility test information, as well as a results queue 144 that stores compatibility test results. The work queue 142 may be used by the test execution module 134 to store one or more compatibility tests that are to be performed. A stored compatibility test may include the URL of a particular web page to be tested and/or the web page source document 110 that corresponds to the particular web page. The stored compatibility test may further include information related to the web browsers to be tested with the particular web page, as well as the test execution properties for performing the browser compatibility test. The execution properties may include one or more cookies, one or more overrides to be applied during the rendering, test description, and/or code portions of each web page source document to be excluded from rendering. The execution properties may further include the script file that is to be implemented for the compatibility test. Each of the compatibility tests may be provided with identification information, such as a test identifier, identification information of the user who requested the test, the date of the test request, the date of test completion, the time of the test request and/or test completion, and/or other relevant identifying information. Accordingly, the compatibility tests may be organized into files in a file directory structure for execution.

The results queue 144 may be used by the test execution module 134 store web page images that are generated by the image capture engine 104. The web page images may be stored in the results queue 144 by compatibility test. Accordingly, the web pages images may be organized into files according to the same file directory structure that stores the compatibility tests, or a parallel file directory structure. In various embodiments, the web page images for each compatibility test may be stores as groups of web page images, in which each group includes one or more web page images as rendered by a corresponding number of selected web browsers before or following a simulated interaction with a web page.

In some embodiments, the work queue 142 and the results queue 144 may be implemented using a simple database or a relational database. The implementation with the relational database may enable complex queries (e.g., a SQL repository) on the data stored in the work queue 142 and the results queue 144. For example, a user may search the work queue 142 and the results queue 144 for specific compatibility tests or test results by requester, test request time/date, test completion test/date, names of web pages being tested, names of web browser tested, and/or the like. The work queue 142 and/or the results queue 144 may further reside on one or more cloud servers 156 that is part of a cloud computing service 158, rather than on the main server 114. The cloud servers 156 of the computing cloud 158 may provide computing resources, as well as data storage and retrieval capabilities.

Rendering Server

The rendering server 116 may include one or more processors 148 and a storage media 150, which may store a plurality of modules. The modules may include routines, programs, objects, components, and data structures that cause each rendering server 116 to perform particular tasks. In various embodiments, the modules may include an operating system 152, the interaction simulation engine 102, the image capture engine 104, and one or more rendering applications 154.

The operating system 152 may include components that enable the main server 114 to receive data via various inputs (e.g., user controls, network interfaces, and/or memory devices), and process the data using the one or more processors 148 to generate output. The operating system 152 may include a display component that presents the output (e.g., display an image on an electronic display, store data in memory, transmit data to another electronic device, etc.). Additionally, the operating system 152 may include other components that perform various other functions generally associated with an operating system.

The interaction simulation engine 102 may receive script commands from the test execution module 134 and implement the script commands as simulated interactions with one or more instances of a web page as rendered by a corresponding number of rendering applications 154. In various embodiments, the interaction simulation engine 102 may use protocols such as Hypertext Transfer Protocol (HTTP), Java Remote Method Invocation (RMI), etc., to exchange data with test execution module 134. Moreover, the interaction simulation engine 102 may also use scripting languages such as JavaScript, XML, etc., to pass the rendered web page images back to the test execution module 134.

Each of the rendering applications 154 may include a browser engine that is configured to carry out the rendering of a web page source document 110 that correspond to the web page. For example, the rendering application 154(1) may include a browser engine that renders web page source documents 110 in the same manner as the web browser Firefox® 4. Similarly, the rendering application 154(N) may include a browser engine that renders web page source documents 110 in the same manner as the web browser Internet Explorer® 7. Other rendering applications 154 may include browser engines that respectively render web page source documents 110 in the same manner as other web browsers, such as Safari® 4, Chrome® 8, and the like. The rendering applications 154 may also include browser engines that render web page source documents 110 for different operating system platform versions of the same web browser. For example, the rendering applications 154 may include browser engines that render a web page source document for a version of Firefox® 4 for the Windows® operating system and a version of Firefox® 4 for the Apple® operating system OS X®.

The rendering applications 154 for different web browsers may be distributed across multiple rendering servers 116. For example, the rendering applications for the Internet Explorer® 7 web browser and the Chrome® 8 web browser may be installed on a first rendering server of a data center, while the rendering applications for the Internet Explorer® 6 web browser, Firebox®, and Safari® 4 web browser may be installed on a second rendering server. In other embodiments, the rendering applications 154 may be web browsers that are distributed across one or more rendering servers 116.

Accordingly, the test execution module 134 on the main server 114 may allocate compatibility tests to each of the rendering applications 154 by matching the browser version described in each compatibility test to the render capability of each rendering application 154. For example, the test execution module 134 may allocate a compatibility test that names Firefox® 4 to the rendering application 154(1), and allocate another compatibility test that names Internet Explorer® 7 to the rendering application 154(N). In at least one embodiment, the rendering capability of each rendering application 154 may be provided to the test execution module 134 in advance, and such metadata may also be stored in the data storage 140. Alternatively, the test execution module 134 may have the ability to communicate with each rendering application 154 to determine the rendering capability of the application prior to sending the appropriate compatibility test.

In various embodiments, the test execution module 134 may release a compatibility test to a particular rendering application 154 from the work queue 142 once the test execution module 134 has detected that the particular rendering application 154 is available, i.e., not processing another compatibility test. In this way, the test execution module 134 may ensure that compatibility tests are efficiently processed based on the availability of each rendering application 154.

In other embodiments, multiple instances of the same rendering application 154 may be executed on the same rendering server 116 or on a plurality of rendering servers 116. For example, users may be more interested in testing the compatibility of web page source documents 110 for Internet Explorer® than Chrome® 8. Accordingly, a rendering server 116 may be configured to execute multiple instances of a rendering application 154 that renders for Internet Explorer® 7, while only executing a single instance of a rendering application 154 that renders for Opera® 9.5. Similarly, two rendering servers 116 may both execute rendering applications that render for Internet Explorer® 7.

Accordingly, in various embodiments, the test execution module 134 may have the ability to cause the one or more rendering servers 116 to initiate or terminate one or more instances of each rendering application 154 depending on the nature of the compatibility tests in its work queue 142. For example, the test execution module 134 may cause a rendering server 116 to initiate another instance of an Internet Explorer® 7 rendering application when the numbers of compatibility tests that involves the testing Internet Explorer® 7 browser compatibility exceeds a predetermined threshold. Such an instance of the rendering application may be instantiated on a rendering server 116 that is less busy (e.g., more CPU idle time) than the resting of the rendering servers. In this way, the test execution module 134 may load balance the rendering of web page images for browser compatibility testing between multiple rendering servers 116.

The image capture engine 104 may receive script commands from the test execution module 134. In response to such script commands, the image capture engine 104 may capture images of each web page as rendered by the one or more selected web browsers that are involved in each compatibility test. As described above, the script commands to the image capture engine 104 may be interspersed with the script commands that activate the interaction simulation engine 102, so that changes in the visual state of a web page in response to each user interaction and/or a series of user interactions, as rendered by each selected browser engine, may be captured.

The implementation of the various components of the dynamic web page compatibility checker described in the client device 112, the main server 114, and the rendering servers 116 may work in conjunction to enable the testing of the compatibility of a web page with one or more web browsers. Moreover, while the main server 114 and the rendering servers 116 are described as implementing particular modules and engines, the modules and engines may be implemented in other location combinations on the servers in other embodiments. Further, while the main functionalities and features of the various components are described above, additional details regarding the operations of the components may be further illustrated with respect to the figures below.

Figure 4:
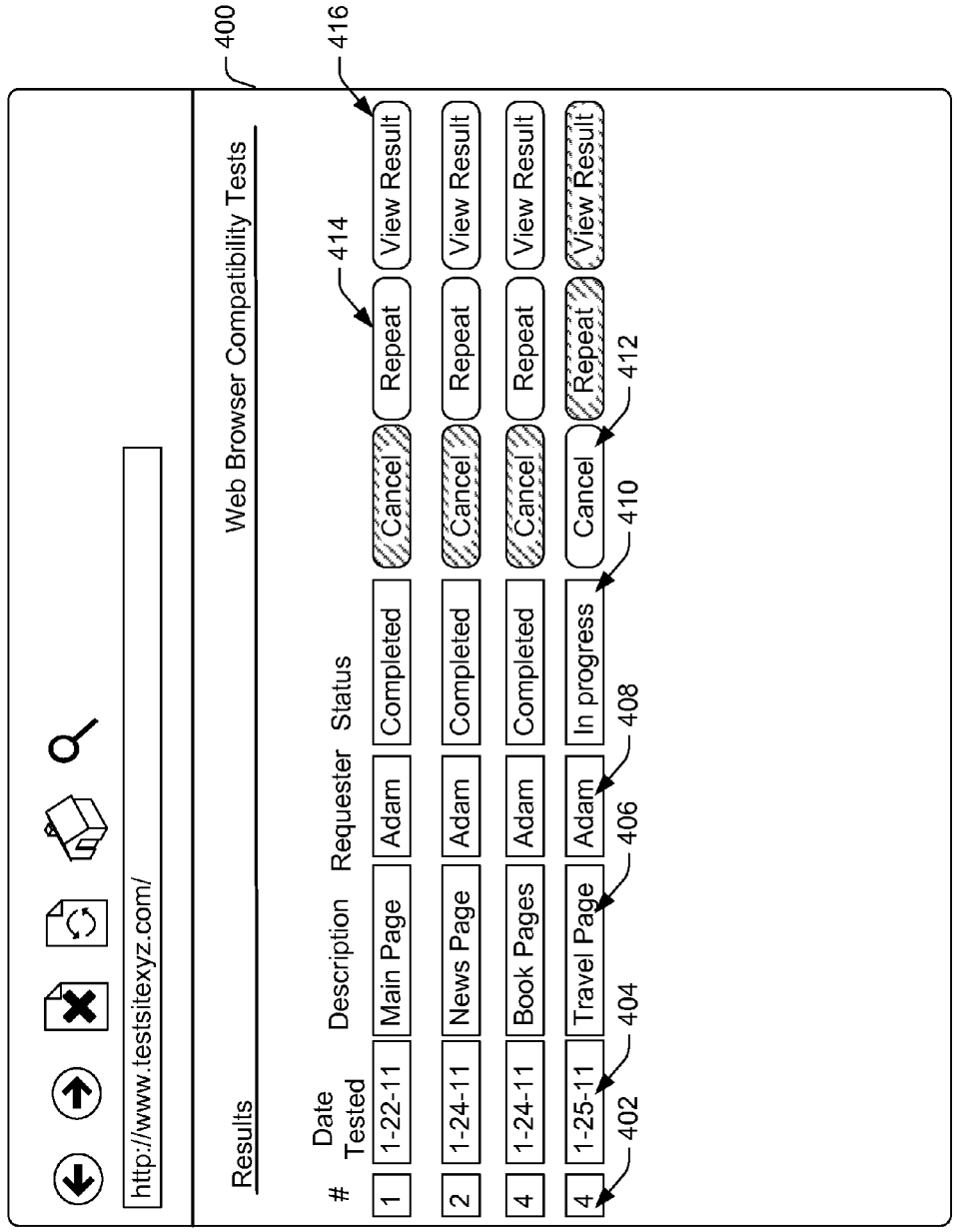
FIG. 4 shows an illustrative user interface page of the dynamic browser compatibility checker that enables the repeated executions of web browser compatibility tests and the cancellation of in-progress web browser compatibility tests.

FIG. 4 shows an illustrative user interface page 400 of the dynamic browser compatibility checker that enables the repeat executions of web browser compatibility tests and the cancellation of in progress web browser compatibility tests. The user interface page 400 may be generated by the test execution module 134. In some embodiments, the user may access the user interface page 400 via the view results option 242 on the menu 232 (FIG. 2). In some embodiments, the user interface page 400 may be displayed for a particular user after the user has authenticated to the dynamic browser compatibility checker (e.g., provided the correct login information).

The user interface page 400 may show each of the one or more browser compatibility tests that are completed for the user. In at least one embodiment, the user interface page 400 may show relevant information for each browser compatibility check test. The relevant information may include a reference number of the test (e.g., reference number 402), the date the test was performed, (e.g., date information 404), and a description 406 of the web page source document 110 that was tested. The relevant information may further include a requester name of the user who requested the test.

The user interface page 400 may also display a test status for each of the compatibility tests requested by the user. For example, as shown in FIG. 4, while the first three tests requested by the user have been completed, test status 410 may indicate that the last test requested by the user is still in progress. When a particular compatibility test in still in progress, the test execution module 134 may configure the user interface page 400 to show a cancel option. Conversely, the cancel option is not available for compatibility tests that are completed. For example, the last test displayed on the user interface page 400 may include an active cancel option 412, while the cancel options for the other compatibility tests listed on the user interface page 400 may be indicated as unavailable (e.g., grayed out). The cancel option 412 may enable the user to abort the corresponding compatibility test, perhaps in the event that the test is taking too long to complete. Each of the compatibility tests listed on the user interface page 400 may also include a repeat option 414 and a view results option 416. However, as shown in FIG. 4, the repeat option and the view results option may be indicated as unavailable (e.g., grayed out) for compatibility tests that are still in progress.

The activation (e.g., selection) of a repeat option, such as the repeat option 414, may cause the test execution module 134 to repeat a compatibility test using the same test execution properties. For example, the results of a compatibility test may have indicated that one of the web browsers tested failed to render a web page correctly after a simulated interaction. Accordingly, the user may click a corresponding repeat option to re-run the compatibility test and confirm the error. In some embodiments, the test execution module 134 may use Ajax and/or jQuery cross-browser JavaScript library calls when repeating a compatibility test to improve the performance of the repeated test.

The activation (e.g., selection) of a results option, such as the results option 416, may cause the test execution module 134 to generate another user interface page that displays the rendered web page images. For example, when a user has elected to perform web browser compatibility testing of a particular web page source document 110 for three different versions of web browsers, the generated user interface page may display three corresponding rendered web page images for each of the web browsers. Thus, the user may visually inspect each of the rendered web page images to determine whether the coding in the particular web page source document 110 is compatible with the web browsers. In some embodiments, the generated user interface page may include a plurality of thumbnail images that the user may individually select (e.g., click) to view corresponding larger versions of the web page images. In some embodiments, the results previously retrieved by a user may be held in a temporary data cache on the main server 114 to speed up retrieval upon a repeat request for the results.

Figure 5:
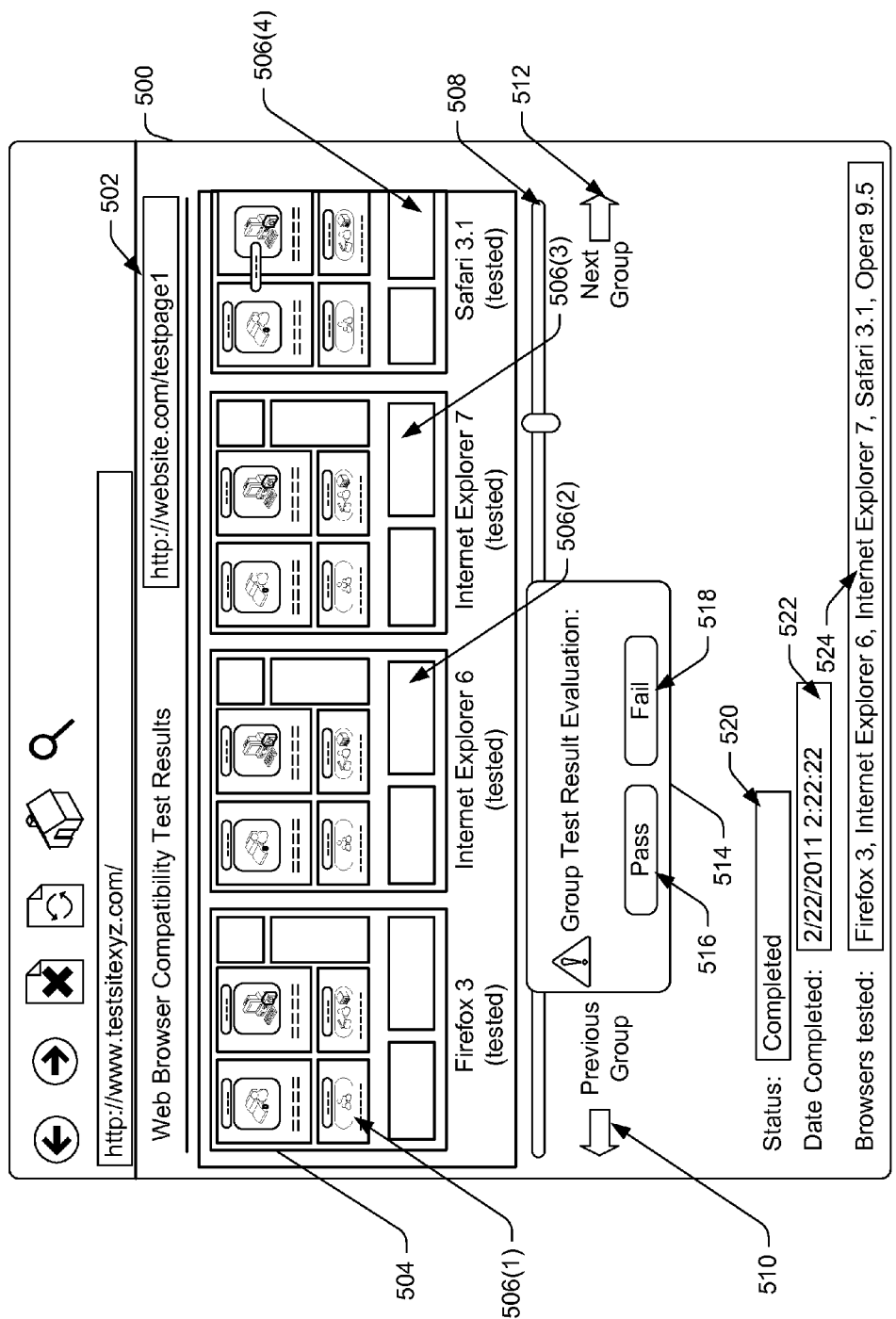
FIG. 5 shows an illustrative user interface page of the dynamic browser compatibility checker that enables a user to evaluate the compatibility of a web page with multiple web browsers.

FIG. 5 shows an illustrative user interface page 500 of the dynamic browser compatibility checker that enables a user to evaluate the compatibility of a web page with multiple web browsers. The user interface page 500 may be generated and displayed for a particular web browser compatibility test by the result report module 138 when the user activates (e.g., selects) a view results option that is displayed on the user interface page 400. The user interface page 500 may include a URL portion 502 that displays the particular URL for which the web page images were rendered. The user interface page 500 may further include an image display portion 504 that displays one or more selectable icons, e.g., selectable icons 506(1)-506(4), which are part of a corresponding group of rendered web page images. As described above, each group of rendered web page images are images generated by one or more web browsers tested before or following a particular simulated user interaction with the web page or after the passage of a particular time interval.

In at least one embodiment, each of the one or more selectable icons may be thumbnail images. The activation (e.g., selection) of each of the selectable icons 506(1)-506(4) may trigger the display of a corresponding larger rendered web page image. The image display portion 504 may further include one or more navigation control 508 (e.g., horizontal and/or vertical scroll bars) that enables the user to scroll and view all of the rendered images. Further, a previous group option 510 and a next group option 512 may enable a user to respectively go back to a previous group of rendered web page images or advance to a subsequent group of rendered page images.

The result report module 138 may also cause the user interface page 500 to display an evaluation input control 514 when a group of rendered web page images is displayed in the image display portion 504 for the first time. The evaluation input control 514 may include a pass option 516 and a fail option 518. The evaluation input control 514 is intended for a user to indicate that all of the rendered web pages in a group are rendered correctly by their respective tested web browsers. Accordingly, the user may select the pass option 516 when the user has examined each of the rendered web pages and believes that each of the test web browsers rendered a particular web page correctly after a simulated user interaction or passage of a predetermined time interval.

On the other hand, if any of the web page images displayed in the image display portion 504 appears to show deviation from the designed appearance of the web page being tested, the user may select the fail option 518. The selection of the fail option 518 may cause the test execution module 134 to display an incompatibility report form via the user interface page 500. The incompatibility report form may enable the user to indicate information such as the name and version of the web browser that failed to render the web page correctly, a description of the rendering problem, and/or other relevant information. The incompatibility report form is further illustrated below in FIG. 6.

The user interface page 500 may include additional portions that display relevant information regarding the web browser compatibility test for the particular web page tested. Such portions may include a status display portion 520 that indicates the status of the web browser compatibility test. For example, the status display portion 520 may indicate the status as one of "completed," "aborted," "error," and the like. Likewise, if the web browser compatibility test was successfully completed, the date and time of completion may be displayed in a completion date portion 522 of the user interface page 500. The additional portions may further include a browser tested portion 524. The browser tested portion 524 may indicate the web browsers that were tested for compatibility with the web page.

Figure 6:
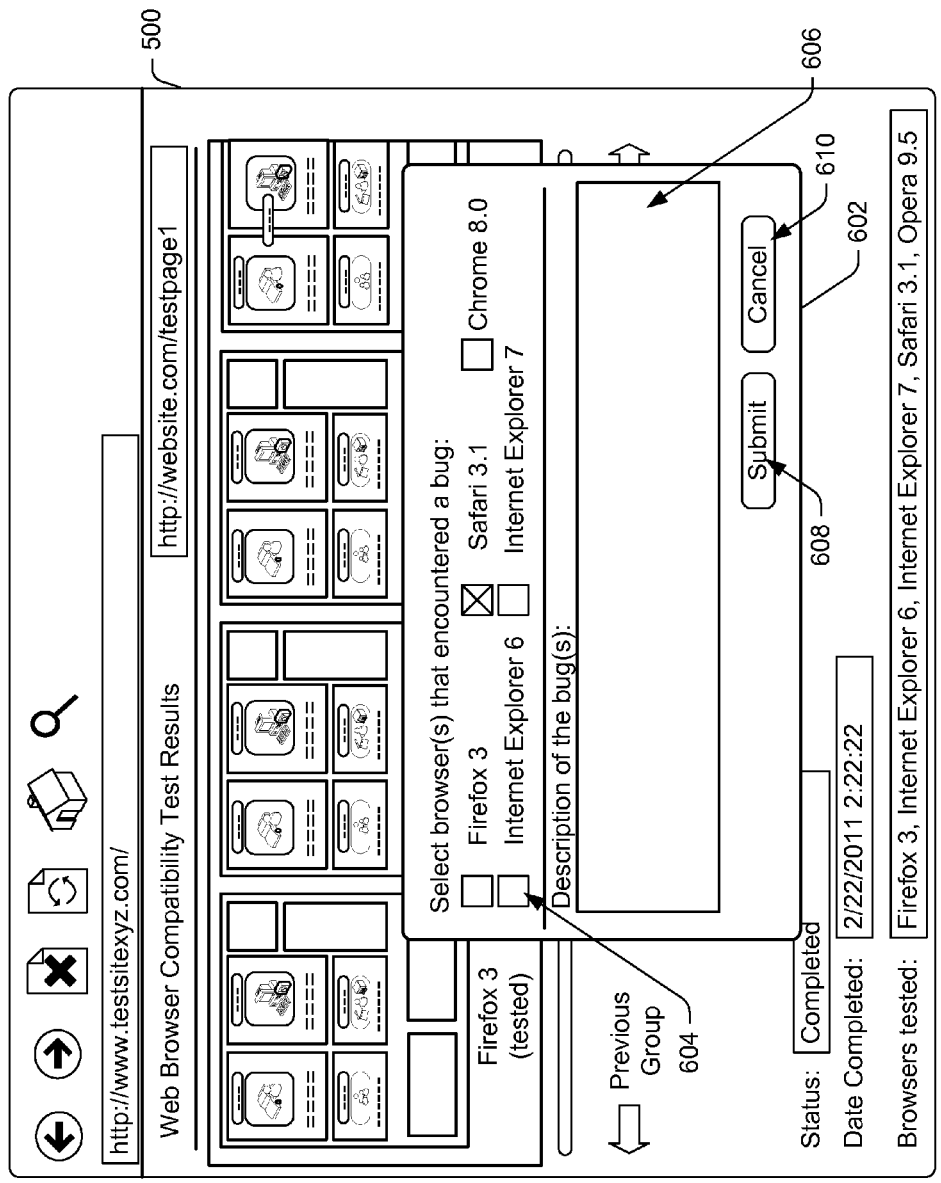
FIG. 6 shows an illustrative incompatibility report form that enables a user to report the improper rendering of a webpage by one or more web browsers.

FIG. 6 shows an illustrative incompatibility report form that enables a user to report the improper rendering of a webpage by one or more web browsers. As described above, the incompatibility report form 602 may be displayed in each instance the user indicates via the fail option 518 that one or more of the web page images displayed in the image display portion 504 appear to show deviation from the designed appearance of the web page. The incompatibility report form 602 may be displayed as an overlay window over the user interface page 500. In at least one embodiment, the incompatibility report form 602 may include check boxes, such as the checkbox 604, that enable the user to select web browser that failed to render the page correctly. The incompatibility report form 602 may further include a description field 606 that enables the user to provide a description of the rendering problem as related to the one or more web browsers and/or other relevant information. For example, the relevant information may include a description of the simulated user interaction that occurred prior to the rendering of the web page images in a group. The user may submit the inputted information to the test execution module 134 by activating (e.g., selecting) the submit option 608. Alternatively, the cancel option 610 may enable the user to dismiss the incompatibility report form 602 without submitting information to the test execution module 134. In some embodiments, along with the inputted information, the test execution module 134 may also automatically capture information related to the user that submitted incompatibility report form 602. Such information may include the particular web development team the user is on, the domain of the client device that the user used to submit the report information, the time/date that the user submitted the report information, and/or the like.

In some embodiments, by using the information gather from various instances of incompatibility report forms, such as the incompatibility report form 602, the test execution module 134 may generate statistics related to the rendering of web pages. Such statistics may include the reported number of deviation from a designed appearance of the web page per each user, per each team of users, per each domain, per each time frame, per each browser, and/or per each operating system platform. Such statistics may enable users to focus their web compatibility testing efforts on problematic web browsers or problematic web page code sections. For example, when the statistics show that a particular web browser version developed for one operating system platform behaves in the same way as another version of the particular web browser developed for another operating system platform, the user may exclude one of the versions of the particular web browser from future testing. Such reduction in testing may reduce computing resource expenditure and enable more focused web browser compatibility testing efforts. In another example, when the statistics show that a particular web browser incompatibility with a web page is systemic across multiple web browsers, the user may choose to prioritize and focus additional efforts at revamping the particular web page.

Illustrative Operations

Figure 7:
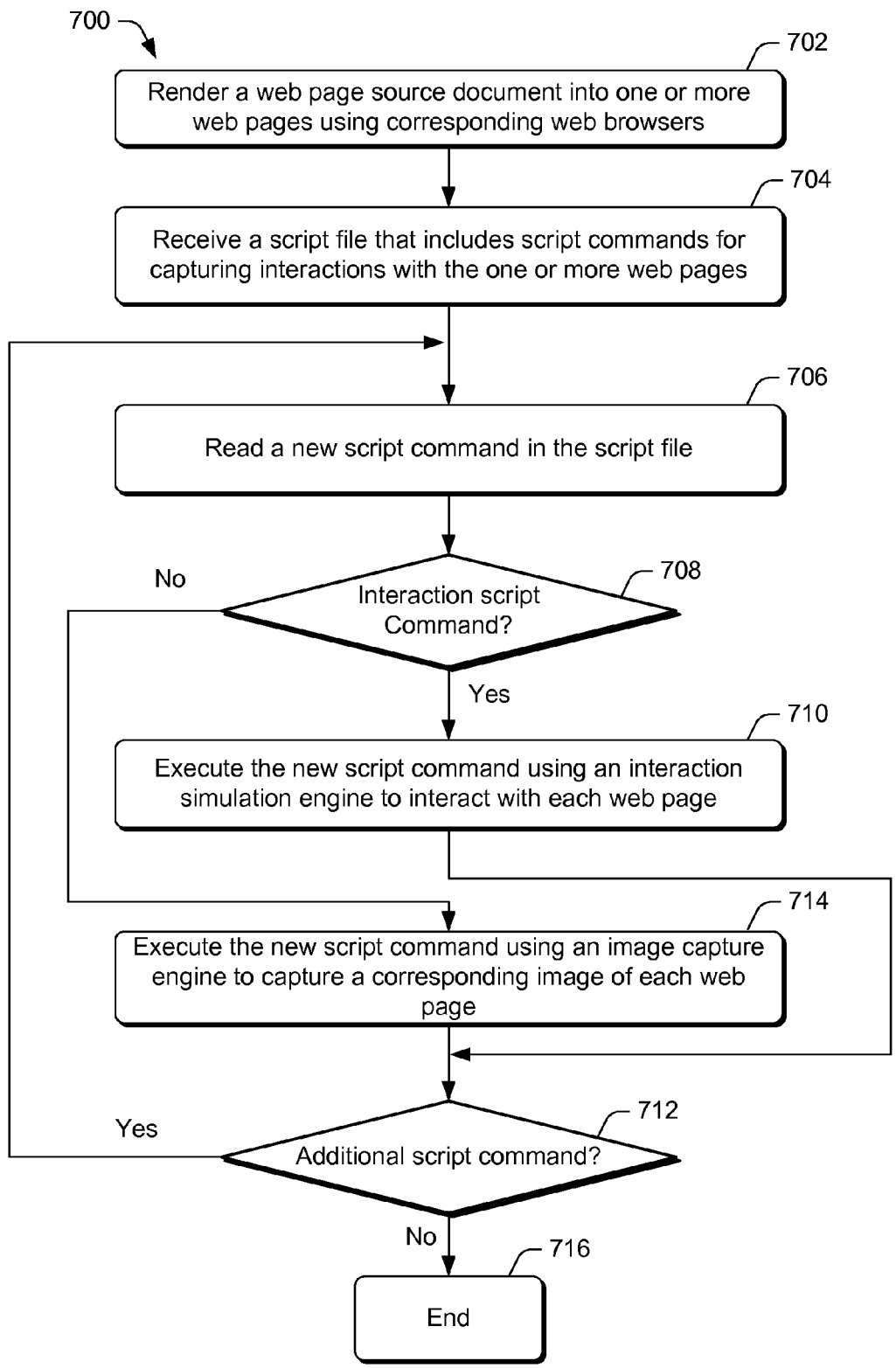
FIG. 7 is a flow diagram of an illustrative process for using a script file to execute the compatibility testing of a web page with one or more web browsers.
Figure 8:
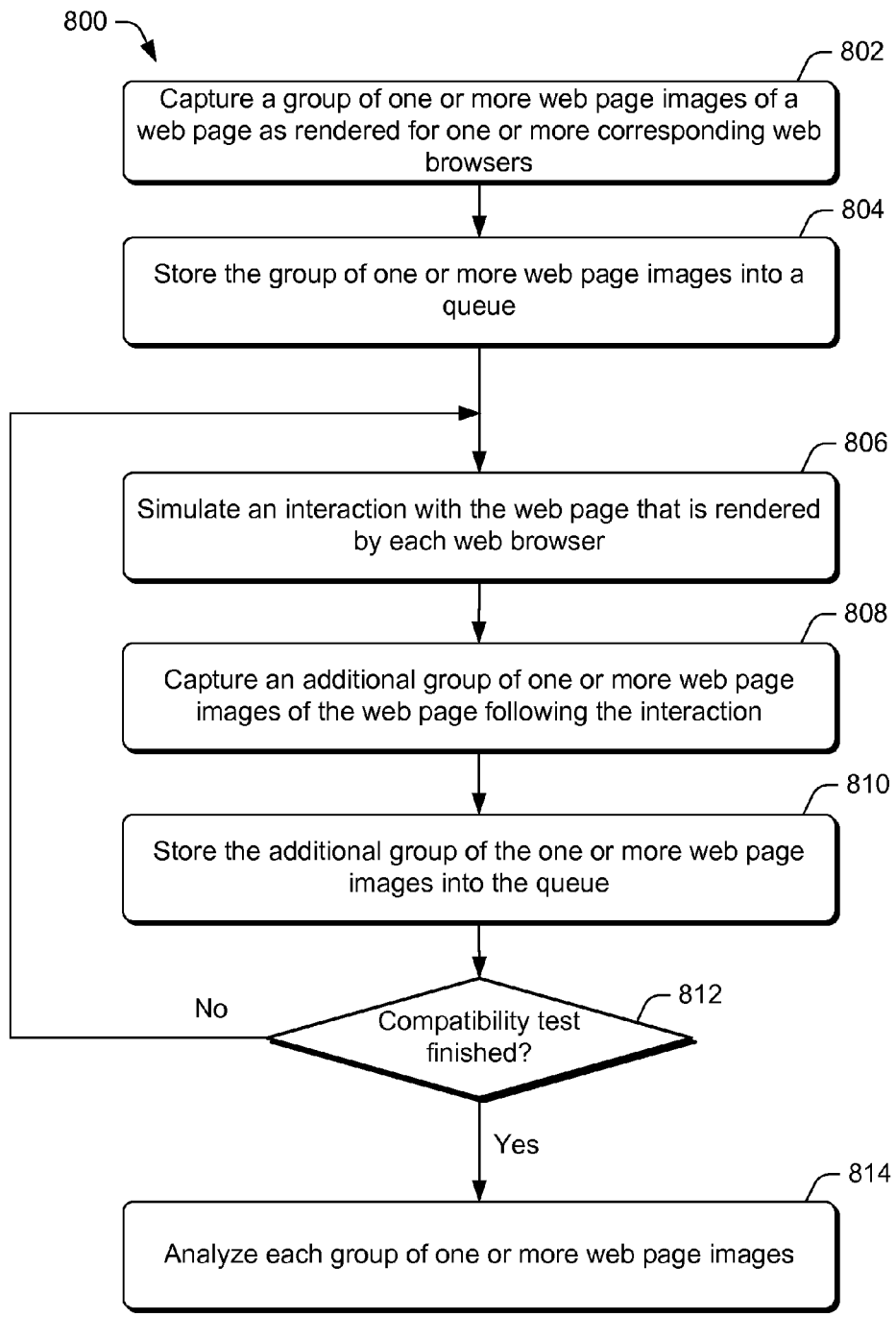
FIG. 8 is a flow diagram of an illustrative process for coordinating simulated interactions with a web page and web page image captures during the compatibility testing of a web page.
Figure 9:
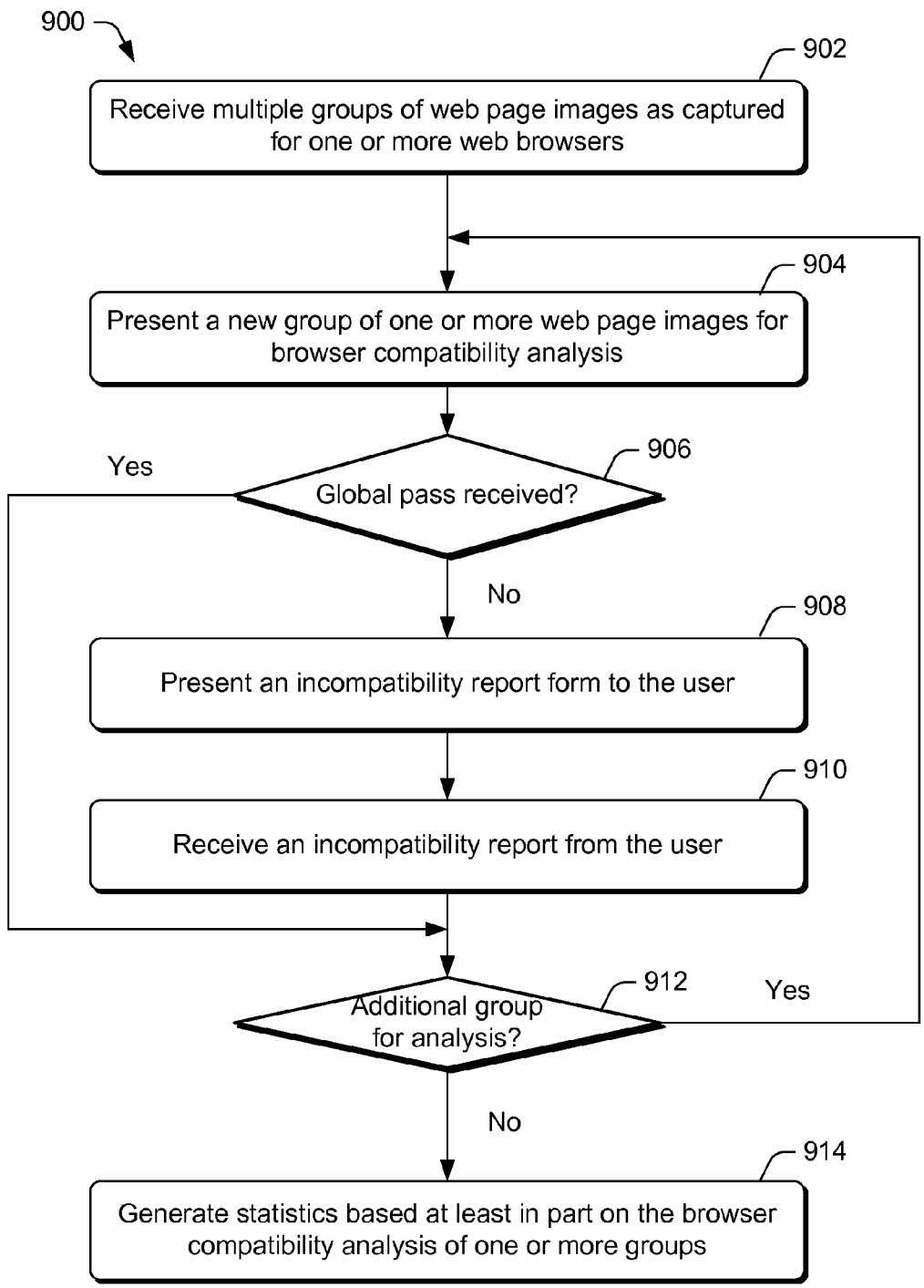
FIG. 9 is a flow diagram of an illustrative process for receiving and analyzing user feedback regarding incompatibilities of one or more web browsers with a web page.

FIGS. 7-9 show illustrative processes 700-900 that implement web browser compatibility checking. Each of the processes 700-900 is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 700-900 are described with reference to the computing environment 100 of FIG. 1.

FIG. 7 is a flow diagram of an illustrative process 700 for using a script file to execute the compatibility testing of a web page with one or more web browsers. The web page may be one of a static web page or a dynamic web page.

At block 702, the test execution module 134 may render a web page source document, such as one of the web page source document 110, using one or more web browsers. The rendering may generate one or more web pages. The rendering may initiate a compatibility testing of the one or more web browsers with a web page that is rendered from the web page source document. In various embodiments, the request to perform the rendering may be initiated by a user at the client device 112 using a user interface page, such as the user interface page 200. The request may be accompanied by additional testing execution properties (e.g., cookies, overrides, response time, and/or the like).

At block 704, the test execution module 134 may also receive a script file that includes script commands for implementing and capturing interactions with the one or more web pages. In various embodiments, the script commands may include one or more interaction simulation engine 102 script commands and one or more image capture engine 104. The script commands for the interaction simulation engine 102 may cause the interaction simulation engine 102 to simulate interaction with each web page that is rendered. The script commands for the image capture engine 104 may direct the image capture engine 104 to capture images of the one or more web pages before or following each simulated interaction.

At block 706, the test execution module 134 may use the script interpretation module 136 to read a new script command in the script file. In instances in which the new script command is an advanced script command for the interaction simulation engine 102, the script interpretation module 136 may use the parser component 146 to parse the advanced script command into script commands that are executable by the interaction simulation engine 102, additional engines, and/or additional functionalities.

At decision block 708, if the test execution module 134 determines that the new script command is for the interaction simulation engine 102 ("yes" at decision block 708), the process 700 may proceed to block 710. In various embodiments, the test execution module 134 may make the determination based on the syntax or the content of the script command.

At block 710, the test execution module 134 may pass the new script command to the interaction simulation engine 102. In turn, the interaction simulation engine 102 may execute the new script command to interact with each web page. For example, the interaction may be clicking and expanding an advertising banner, scrolling down a web page, sorting data on the web page, and/or the like. Subsequently, the process 700 may proceed to decision block 712.

Returning to decision block 708, if the test execution module 134 determines that the new script command is for the image capture engine 104 ("no" at decision block 708), the process 700 may proceed to block 714. At block 714, the test execution module 134 may execute the new script command to capture a corresponding image of each web page. The number of web page images captured may correspond to the number of web browsers that are selected for compatibility testing at block 702. Subsequently, the process 700 may once again proceed to decision block 712.

At decision block 712, the test execution module 134 may determine whether there is an additional script command in the script file to be read and executed. In various embodiments, the test execution module 134 may sequentially read and execute the script commands in the script file until the end of the script file is reached. Thus, if the test execution module 134 determines that there is an additional script in the script file ("yes" at decision block 712), the process 700 may loop back to block 706 so that another new script command in the script file may be read. However, if the test execution module 134 determines that there are no additional script commands ("no" at decision block 712), the process 700 may terminate at block 716.

FIG. 8 is a flow diagram of an illustrative process 800 for coordinating simulated interactions with a web page and web page image captures during the compatibility testing of a web page. The web page may be one of a static web page or a dynamic web page.

At block 802, the image capture engine 104 may capture a group of one or more web page images of a web page. The group of web pages may be render by one or more rendering applications for at least one web browser that are selected for compatibility testing with the web page. At block 804, the image capture engine 104 may store the group of one or more web page images into a queue, such as the results queue 144.

At block 806, the interaction simulation engine 102 may simulation an interaction with the web page that is rendered by each web browser. For example, the simulated interaction may be clicking and expanding on an advertising banner, scrolling down the web page, sorting data on the web page, and/or the like.

At block 808, the image capture engine 104 may capture an additional group of one or more web page images of the web page. The additional group of web page images may capture changes in the appearance of the web page as rendered by each web browser that result from the simulated interaction. At block 810, the image capture engine 104 may store the group of one or more web page images into a queue, such as the results queue 144.

At decision block 812, if the compatibility test is not finished ("no" at decision block 812), the process 800 may loop back to block 806 so that another interaction with the web page may be simulated by the interaction simulation engine 102. However, if the compatibility test is finished ("yes" at decision block 812), the process 800 may proceed to block 814.

At block 814, the one or more groups of web page images may be analyzed. In various embodiments, the analysis may include determining whether each web browser is compatibility with the web page based on the groups of the web page images. The analysis may further include detecting trends or patterns in the incompatibilities experienced by the one or more web browsers that are tested.

FIG. 9 is a flow diagram of an illustrative process 900 for receiving and analyzing user feedback regarding incompatibilities of one or more web browsers with a web page. The process 900 may further illustrate block 814 of the process 800. The web page may be one of a static web page or a dynamic web page.

At block 902, the test execution module 134 may receive multiple groups of web page images. The multiple groups of web page images may be captured by the image capture engine 104 for the one or more web browsers that are being tested for compatibility with a web page. Each group of the web page images may be captured before or following a simulated interaction with the web page as a part of a particular compatibility test.

At block 904, the test execution module 134 may use the result report module 138 to present a new group of one or more web page images for browser compatibility analysis by a user. In some embodiments, the new group may be presented via the user interface page 500. With the presentation of the new group, the user interface page 500 may also present an evaluation input control 514 that enables the user to indicate whether all of the web page images in the new group show that their corresponding web browsers are compatible with web page.

At decision block 906, the result report module 138 may determine whether a global pass is received from the user via the evaluation input control 514. In various embodiments, the user may select a pass option 516 on the evaluation input control 514 to indicate a global pass if all the web page images in the new group appear sufficiently match the designed appearance of the web page. However, if at least one of the web page images in the group appears to show deviation from the designed appearance of the web page being tested, the user may select the fail option 518 on the evaluation input control 514 to indicate a global fail. Thus, when the result report module 138 does not receive a global pass ("no" at decision block 906), the process 900 may proceed to block 908.

At block 908, the result report module 138 may present an incompatibility report form to the user via a user interface, such as the user interface page 500. The incompatibility report form may enable the user to indicate information such as the name and version of the web browser that failed to render the web page correctly, a description of the rendering problem, and/or other relevant information. At block 910, the result report module 138 may receive a completed incompatibility report from the user, in which the user has provided the relevant incompatibility information.

At decision block 912, the result report module 138 may determine whether there is an additional group of one or more web page images related to the particular compatibility test that may be presented for analysis. If the result report module 138 determines that at least one additional group may be presented for analysis ("yes" at decision block 912), the process 900 may loop back to block 904, so that another new group of one or more web page images may be analyzed.

However, if the result report module 138 determines that there are no more additional groups to be presented for analysis ("no" at decision block 912), the process 900 may proceed to block 914.

At block 914, the test execution module 134 may generate statistics based at least in part on the information obtained from the compatibility analysis of the one or more groups. Such statistics may include the reported number of deviation from a designed appearance of the web page per each user, per each team of users, per each domain, per each time frame, per each browser version, and/or per each operating system platform. Such statistics may enable users to focus their web compatibility testing efforts on problematic web browsers or problematic web page code sections.

In summary, the dynamic browser compatibility checker in accordance with the various embodiments described above may assist users such as web content developers in meeting testing and quality objectives in a more efficient manner, shorten web page development cycles. This tool may also reduce the time burden associated with browser compatibility testing of web pages.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer implemented method, comprising:
rendering a web page source document using one or more rendering applications on a server to generate one or more web pages, each of the one or more rendering applications corresponding to a different web browser;
simulating, for the one or more rendering applications, an interaction with each of one or more web pages that changes a corresponding visual state of the each of the one or more web pages based at least on an interaction script command in a script file;
capturing, using an image capture application, for the one or more rendering applications, a web page image of each of the one or more web pages prior to or following one or more visual state changes based at least in part on an image capture script command in the script file;
presenting, for the one or more rendering applications, one or more web page images that are captured at a client device for determination of whether an appearance of at least one web page image deviates from a designed appearance, each deviation indicating a failure of a corresponding web browser to properly render the web page source document;
receiving a failure indication that is manually inputted at the client device, the failure indication indicating an appearance of the at least one web page image presented by the one or more rendering applications deviates from the designed appearance; and
obtaining information that is manually inputted at the client device regarding each of one or more deviations following the receiving the failure indication.

2. The computer implemented method of claim 1, further comprising generating statistics based at least in part on a plurality of deviations, the statistics including at least one of a number of deviations reported per each user, a number of deviations reported per each team of users, a number of deviations reported per each domain, a number of deviations per each time frame, a number of deviations per each web browser, or a number of deviations per each operating system platform.

3. The computer implemented method of claim 1, wherein the interaction script command is an advanced script command that implements an interaction with multiple interaction steps via at least one of a specialized script engine or a custom browser execution functionality.

4. A computer implemented method, comprising:
under control of one or more computing systems configured with executable instructions, implementing a compatibility test that evaluates rendering of a web page source document by one or more web browsers, the compatibility test including:
rendering a web page source document using one or more rendering applications to generate one or more web pages, each of the one or more rendering applications corresponding to a different web browser;
simulating, using the one or more rendering applications, a user interaction with each of the one or more web pages that changes a corresponding visual state of the each of the one or more web pages based at least on an interaction script command in a script file;
capturing, for the one or more rendering applications, a web page image of each of the one or more web pages following one or more visual state changes based at least on an image capture script command in the script file;
presenting one or more web page images that are captured to a user at a client device for determination of whether an appearance of at least one web page image deviates from a designed appearance;
receiving a failure indication that is manually inputted at the client device in an instance in which an appearance of the at least one web page image as presented to the user deviates from the designed appearance; and
receiving a pass indication that is manually inputted at the client device in an instance in which appearances of all web page images as presented to the user sufficiently match the designed appearance.

5. The computer implemented method of claim 4, further comprising capturing an additional web page image of a web page prior to the interaction based at least on another image capture script command in the script file.

6. The computer implemented method of claim 4, further comprising obtaining information that is manually inputted at the client device regarding at least one deviation of a web page image from the designed appearance following the receiving the failure indication.

7. The computer implemented method of claim 6, further comprising generating statistics based at least on information regarding a plurality of deviations following the receiving the failure indication.

8. The computer implemented method of claim 7, wherein the statistics includes at least one of a number of deviations reported per each user, a number of deviations reported per each team of users, a number of deviations reported per each domain, a number of deviations per each time frame, a number of deviations per each web browser, or a number of deviations per each operating system platform.

9. The computer implemented method of claim 6, wherein each deviation indicates a failure of a corresponding web browser to properly render the web page source document.

10. The computer implemented method of claim 4, further comprising storing one or more web page images that are captured in a simple database or a relational database.

11. The computer implemented method of claim 4, further comprising caching one or more web page images that are captured in a temporary cache to speed up a subsequent retrieval of the one or more web page images.

12. The computer implemented method of claim 4, further comprising:
receiving a designation of a time period for rendering an additional web page source document; and
terminating a compatibility test that evaluates the rendering of the additional web page source document by the one or more web browsers after the time period expires.

13. The computer implemented method of claim 4, further comprising at least one of repeating the compatibility test when a repeat command is selected via a user interface or terminating the compatibility test when a terminating command is selected via the user interface.

14. The computer implemented method of claim 13, wherein the repeating includes implementing at least one of an asynchronous JavaScript and XML (Ajax) call or a jQuery call to repeat a performance of the compatibility test.

15. The computer implemented method of claim 4, wherein the interaction script command is an advanced script command that implements an interaction with multiple interaction steps via at least one of a specialized script engine or a custom browser execution functionality.

16. The computer implemented method of claim 4, wherein the rendering includes rendering the web page source document using execution properties including at least one of a test description, a cookie to be used by each of the one or more rendering applications, a code portion of the web page source document to exclude, or an override to be used by each of the one or more rendering applications.

17. One or more non-transitory computer readable media storing computer-executable instructions that, when executed, cause one or more processors to perform acts comprising:
receiving a script file that includes script commands for capturing interactions with a web page that is rendered by a rendering application;
executing the script file;
based at least partly on the executing the script file, coordinating a plurality of interactions with the web page with corresponding web page image captures; the coordinating including:
directing an interaction simulation engine to simulate the plurality of interactions with the web page based at least on an interaction script command included in the script file;
triggering an image capture engine to capture web page images of individual ones of the plurality of interactions with the web page based at least on an image capture script command included in the script file; and
receiving a failure indication that is manually inputted by a user in an instance in which an appearance of one web page image of the web page images deviates from a designed appearance, the failure indication indicating that the rendering application failed to properly render the web page.

18. One or more non-transitory computer readable media of claim 17, further comprising instructions that when executed, cause one or more processors to perform acts comprising: obtaining information that is manually inputted at the client device regarding a deviation of a web page image from the designed appearance based at least partly on receiving the failure indication.

19. One or more non-transitory computer readable media of claim 18, further comprising instructions that when executed, cause one or more processors to perform an act of generating statistics based at least on information regarding a plurality of deviations.

20. One or more non-transitory computer readable media of claim 18, further comprising instructions that when executed, cause one or more processors to perform an act of receiving a pass indication that is manually inputted at the client device in another instance in which appearances of the web page images presented sufficiently match the designed appearance.

21. One or more non-transitory computer readable media of claim 17, further comprising instructions that when executed, cause one or more processors to perform an act of identifying a script command as the interaction script command or the image capture script command based on at least one of a syntax of the script command or content of the script command.

22. One or more non-transitory computer readable media of claim 17, further comprising instructions that when executed, cause one or more processors to perform an act of parsing a script command that is an advanced script command into multiple interaction steps, wherein the interaction simulation engine implements the interaction steps via at least one of a specialized script engine or a custom browser execution functionality.

23. One or more non-transitory computer readable media of claim 22, wherein the interaction simulation engine implements the multiple interaction steps by performing asynchronous JavaScript and XML (Ajax) operations.

24. One or more non-transitory computer readable media of claim 17, wherein the web page is rendered from a web page source document by the rendering application that corresponds to a web browser.

25. A system, comprising:
one or more processors; and
memory storing components executable by the one or more processors, the components comprising:
rendering applications that generate web pages from a web page source document, the rendering applications including different web browsers;
a script interpretation module that reads a script command from a script file as an interaction script command or an image capture script command;
an interaction simulation engine that simulates a user interaction with web pages that changes visual states of the web pages based at least on the interaction script command;
an image capture engine that captures web page images of the web pages based at least on the image capture script command following the changes of the visual states; and
a result report module that receives a failure indication that is manually inputted by a user in an instance in which an appearance of a web page image as presented to the user deviates from a designed appearance, the failure indication indicating that a rendering application of the rendering applications failed to properly generate a web page.

26. The system of claim 25, wherein the result report module further obtains information that is manually inputted at the client device regarding a deviation following the receiving the failure indication.

27. The system of claim 25, further comprising a test execution module that generates statistics based at least on information regarding a plurality of deviations.

* * * * *